United States Patent
Sadamura et al.

(10) Patent No.: US 12,534,077 B2
(45) Date of Patent: Jan. 27, 2026

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Satoshi Sadamura, Tokyo (JP); Yoshihiko Kosegaki, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 169 days.

(21) Appl. No.: 18/589,481

(22) Filed: Feb. 28, 2024

(65) Prior Publication Data
US 2024/0326800 A1 Oct. 3, 2024

(30) Foreign Application Priority Data

Mar. 30, 2023 (JP) .................................. 2023-055249

(51) Int. Cl.
*B60W 30/14* (2006.01)
*B60W 50/14* (2020.01)

(52) U.S. Cl.
CPC .......... *B60W 30/143* (2013.01); *B60W 50/14* (2013.01); *B60W 2520/105* (2013.01); *B60W 2540/106* (2013.01); *B60W 2552/15* (2020.02); *B60W 2552/30* (2020.02)

(58) Field of Classification Search
None
See application file for complete search history.

(56) References Cited

U.S. PATENT DOCUMENTS

| | | | |
|---|---|---|---|
| 8,892,329 B2 * | 11/2014 | Yasui | B60W 30/146 701/72 |
| 9,885,578 B2 * | 2/2018 | Mizuno | G01C 21/3811 |
| 10,328,936 B2 * | 6/2019 | Kelly | B60W 30/146 |
| 12,139,138 B2 * | 11/2024 | Bott | B60W 30/18145 |

(Continued)

FOREIGN PATENT DOCUMENTS

| | | |
|---|---|---|
| JP | 11-218217 | 8/1999 |
| JP | 2010-076695 | 4/2010 |

(Continued)

OTHER PUBLICATIONS

Japanese Office Action for Japanese Patent Application No. 2023-055249 mailed Nov. 19, 2024.

*Primary Examiner* — Jonathan M Dager
(74) *Attorney, Agent, or Firm* — Amin, Turocy & Watson, LLP

(57) ABSTRACT

While the vehicle is traveling in a segment from an entrance to a curved road to a position a predetermined distance before the entrance or while the vehicle is traveling on the curved road, the vehicle control device performs assistance control that is one or both of deceleration control based on first information and notification control, accelerates the vehicle at first acceleration in a case where second information has been acquired when the vehicle is not traveling in the segment or on the curved road and the assistance control is not operating, and accelerates the vehicle at second acceleration that is suppressed as compared with the first acceleration by ending the assistance control in a case where the second information has been acquired when the vehicle is performing the assistance control.

13 Claims, 9 Drawing Sheets

(56) References Cited

U.S. PATENT DOCUMENTS

| | | | | |
|---|---|---|---|---|
| 2007/0208485 | A1* | 9/2007 | Yamamura | G01C 21/3697 701/93 |
| 2009/0132139 | A1* | 5/2009 | Takeuchi | B60W 30/18009 701/70 |
| 2009/0198426 | A1* | 8/2009 | Yasui | B60W 10/11 701/70 |
| 2009/0216415 | A1* | 8/2009 | Iwatsuki | B60W 30/188 701/70 |
| 2009/0240413 | A1* | 9/2009 | Miyajima | B60W 50/0098 701/70 |
| 2009/0265072 | A1* | 10/2009 | Kondou | B60W 30/025 701/90 |
| 2010/0082216 | A1* | 4/2010 | Yasui | B60K 31/0066 701/93 |
| 2017/0129482 | A1* | 5/2017 | Sunahara | B60W 30/045 |
| 2021/0323542 | A1 | 10/2021 | Naka | |
| 2024/0326813 | A1* | 10/2024 | Sadamura | B60W 50/0097 |
| 2024/0400049 | A1* | 12/2024 | Sadamura | B60W 50/14 |

FOREIGN PATENT DOCUMENTS

| | | |
|---|---|---|
| JP | 2012-206587 | 10/2012 |
| JP | 5190022 | 4/2013 |
| JP | 2021-170232 | 10/2021 |

\* cited by examiner

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2023-055249, filed Mar. 30, 2023, the content of which is incorporated herein by reference.

BACKGROUND

Field of the Invention

The present invention relates to a vehicle control device, a vehicle control method, and a storage medium.

Description of Related Art

In recent years, efforts to provide sustainable transportation systems that take into account various situations have become active. In order to implement this, research and development are aimed to further improve traffic safety and convenience through research and development of driving assistance technology. For example, an automatic brake device that applies a braking force to a vehicle before entering a curve until the speed reaches a safe speed at which it can safely enter the curve is disclosed (Japanese U.S. Pat. No. 5,190,022). This automatic brake device determines whether or not a distance to the entrance to the curve is more than or equal to a predetermined distance, determines the presence or absence of an acceleration intention of a driver when it is determined that the distance to the entrance to the curve is more than or equal to the predetermined distance, and reduces the braking force according to the presence or absence of the acceleration intention.

SUMMARY OF THE INVENTION

In conventional devices, it has been difficult to implement a vehicle control process corresponding to a driver's intention. For example, it has been difficult to cause the vehicle to perform acceleration corresponding to the driver's intention.

The present invention has been made in consideration of such circumstances and can implement a vehicle control process corresponding to a driver's intention. For example, the vehicle can be allowed to accelerate according to the driver's intention. By extension, it can contribute to the development of a sustainable transportation system by taking into account occupants.

A vehicle control device, a vehicle control method, and a storage medium according to the present invention adopt the following configurations.

(1): According to an aspect of the present invention, there is provided a vehicle control device including: a storage medium storing computer-readable instructions; and one or more processors connected to the storage medium, the processor executing the computer-readable instructions to: acquire first information about a curved road located in a travel direction of a vehicle; acquire second information about an acceleration operation of a driver of the vehicle; and while the vehicle is traveling in a segment from an entrance to the curved road to a position a predetermined distance before the entrance or while the vehicle is traveling on the curved road, perform assistance control that is one or both of deceleration control for decelerating the vehicle so that a speed of the vehicle approaches a target speed based on the first information and notification control for notifying that the speed of the vehicle approaches the target speed, accelerate the vehicle at first acceleration in a case where the second information has been acquired when the vehicle is not traveling in the segment or on the curved road and the assistance control is not operating, and accelerate the vehicle at second acceleration that is suppressed as compared with the first acceleration by ending the assistance control in a case where the second information has been acquired when the vehicle is performing the assistance control.

(2): In the above-described aspect (1), the processor executes the computer-readable instructions to: cause the acceleration of the vehicle to reach the target acceleration at a first time by accelerating the vehicle at the first acceleration in a case where the second information indicating that a first acceleration operation has been performed to cause the acceleration of the vehicle to approach the target acceleration has been acquired when the vehicle is not traveling in the segment or on the curved road and the assistance control is not operating; and cause the acceleration of the vehicle to reach the target acceleration at a second time after the first time by ending the assistance control and accelerating the vehicle at the second acceleration in a case where the second information indicating that the first acceleration operation has been performed has been acquired when the assistance control is being performed.

(3): In the above-described aspect (1), the acceleration operation is performed by the driver operating an operation element, and the processor executes the computer-readable instructions to: acquire information indicating an operation speed for the operation element included in the second information; and increase the second acceleration as the operation speed increases.

(4): In the above-described aspect (1), the acceleration operation is performed by the driver operating an operation element, and the processor executes the computer-readable instructions to: acquire information indicating an operation amount for the operation element included in the second information; and accelerate the vehicle until acceleration corresponding to the operation amount is reached.

(5): In the above-described aspect (1), the acceleration operation is performed by the driver operating an operation element, and the processor executes the computer-readable instructions to: acquire operation information indicating one or both of an operation amount and an operation speed for the operation element included in the second information; and accelerate the vehicle by stopping the assistance control when the operation information satisfies a condition.

(6): In the above-described aspect (5), the condition is one of conditions (1) to (3), condition (1) is that the operation amount of a predetermined period reaches a first threshold value, condition (2) is that the operation element is operated at an operation speed greater than or equal to a second threshold value and the operation amount reaches a third threshold value, and condition (3) is that an operation of the operation amount greater than or equal to a fourth threshold value is performed a plurality of times.

(7): In the above-described aspect (1), the acceleration operation is performed by the driver operating an operation element, and the processor executes the computer-readable instructions to: acquire information indicating an operation amount of an operation of accelerating the vehicle for the operation element included in the second information; and stop the assistance control when a cumulative value of the operation amount at a predetermined time has reached a threshold value.

(8): In the above-described aspect (7), the processor executes the computer-readable instructions to: accumulate an operation amount of an operation on the operation element for accelerating the vehicle from the time when the operation element is operated to accelerate the vehicle to the time when a set time period elapses; stop the assistance control when the accumulated operation amount has reached a threshold value; and continue the assistance control even if the operation element is operated when the accumulated operation amount has not reached the threshold value before the set time period elapses.

(9): In the above-described aspect (1), the processor executes the computer-readable instructions to: acquire information of a gradient of the curved road; accelerate the vehicle at third acceleration by ending the assistance control in a case where the second information has been acquired when the gradient is a downward gradient and the assistance control is being performed; and accelerate the vehicle at the second acceleration by ending the assistance control in a case where the second information has been acquired when the curved road does not have a downward gradient or the curved road is a flat road and the assistance control is being performed, and the third acceleration is acceleration that is suppressed as compared with the second acceleration.

(10): In the above-described aspect (1), the processor executes the computer-readable instructions to suppress the third acceleration more when the downward gradient of the curved road is large than when the downward gradient of the curved road is small.

(11): In the above-described aspect (9), the acceleration operation is performed by the driver operating an operation element, and the processor executes the computer-readable instructions to: acquire operation information indicating one or both of an operation amount and an operation speed for the operation element included in the second information; accelerate the vehicle by stopping the assistance control when the operation information satisfies a condition; and mitigate the condition as the gradient increases.

(12): According to another aspect of the present invention, there is provided a vehicle control method including: acquiring, by a computer, first information about a curved road located in a travel direction of a vehicle; acquiring, by the computer, second information about an acceleration operation of a driver of the vehicle; and while the vehicle is traveling in a segment from an entrance to the curved road to a position a predetermined distance before the entrance or while the vehicle is traveling on the curved road, performing, by the computer, assistance control that is one or both of deceleration control for decelerating the vehicle so that a speed of the vehicle approaches a target speed based on the first information and notification control for notifying that the speed of the vehicle approaches the target speed, accelerating, by the computer, the vehicle at first acceleration in a case where the second information has been acquired when the vehicle is not traveling in the segment or on the curved road and the assistance control is not operating, and accelerating, by the computer, the vehicle at second acceleration that is suppressed as compared with the first acceleration by ending the assistance control in a case where the second information has been acquired when the vehicle is performing the assistance control.

(13): According to yet another aspect of the present invention, there is provided a non-transitory computer storage medium storing a program for causing a computer to: acquire first information about a curved road located in a travel direction of a vehicle; acquire second information about an acceleration operation of a driver of the vehicle; and while the vehicle is traveling in a segment from an entrance to the curved road to a position a predetermined distance before the entrance or while the vehicle is traveling on the curved road, perform assistance control that is one or both of deceleration control for decelerating the vehicle so that a speed of the vehicle approaches a target speed based on the first information and notification control for notifying that the speed of the vehicle approaches the target speed, accelerate the vehicle at first acceleration in a case where the second information has been acquired when the vehicle is not traveling in the segment or on the curved road and the assistance control is not operating, and accelerate the vehicle at second acceleration that is suppressed as compared with the first acceleration by ending the assistance control in a case where the second information has been acquired when the vehicle is performing the assistance control.

According to the aspects (1) to (13), in the vehicle control device, the vehicle control method, or the storage medium, when the second information is acquired while the assistance control is being performed, it is possible to implement the control of the vehicle corresponding to the driver's intention by ending the assistance control and accelerating the vehicle at the second acceleration that is suppressed as compared with the first acceleration. For example, it is possible to suppress the occurrence of acceleration greater than the acceleration assumed by the driver, and the driver can perform an override with peace of mind.

According to the aspect (3), the vehicle control device can perform an acceleration process at acceleration corresponding to the driver's intention, acceleration assumed by the driver, or acceleration close thereto.

According to the aspect (4), the vehicle control device can suppress the occurrence of acceleration exceeding the acceleration corresponding to the driver's intention, acceleration exceeding the acceleration assumed by the driver, or acceleration exceeding acceleration close thereto by accelerating the vehicle until the acceleration corresponding to the operation amount is reached immediately after an override.

According to the aspects (5) to (8), the vehicle control device can perform acceleration corresponding to the driver's intention. For example, when the driver's intention to accelerate is clear, because the assistance control is released, control reflecting the driver's intention is implemented.

According to the aspects (9) to (11), the vehicle control device can implement a vehicle control process corresponding to the driver's intention on a downhill road. For example, the occurrence of acceleration not intended by the driver is suppressed on the downhill road, and acceleration exceeding the acceleration corresponding to the driver's intention, acceleration exceeding the acceleration assumed by the driver, or acceleration exceeding acceleration close thereto can be suppressed immediately after an override.

DETAILED DESCRIPTION OF THE INVENTION

Hereinafter, embodiments of a vehicle control device, a vehicle control method, and a storage medium of the present invention will be described with reference to the drawings.

Embodiments

[Overall Configuration]

Figure 1:
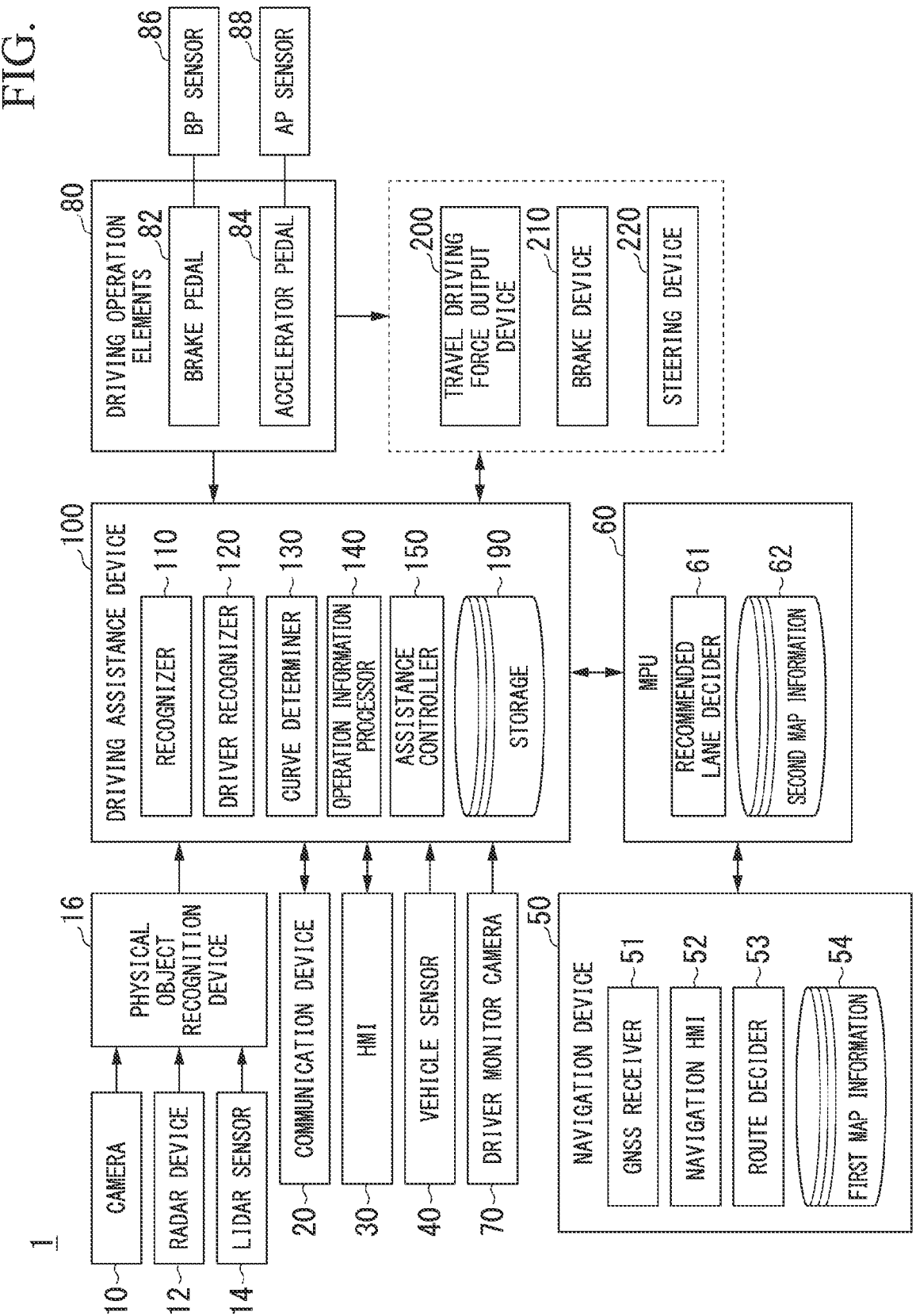
FIG. 1 is a configuration diagram of a vehicle system using a vehicle control system according to an embodiment.

FIG. 1 is a configuration diagram of a vehicle system 1 using a vehicle control system according to an embodiment. A vehicle in which the vehicle system 1 is mounted is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination thereof. The electric motor operates using electric power generated by a power generator connected to the internal combustion engine or electric power when a secondary battery or a fuel cell is discharged.

For example, the vehicle system 1 includes a camera 10, a radar device 12, a light detection and ranging (LIDAR) sensor 14, a physical object recognition device 16, a communication device 20, a human machine interface (HMI) 30, a vehicle sensor 40, a navigation device 50, a map positioning unit (MPU) 60, a driver monitor camera 70, a driving operation element 80, a driving assistance device 100, a travel driving force output device 200, a brake device 210, and a steering device 220. Such devices and equipment are connected to each other by a multiplex communication line such as a controller area network (CAN) communication line, a serial communication line, or a wireless communication network. The configuration shown in FIG. 1 is merely an example and some of the components may be omitted or other components may be further added. The driving assistance device 100 is an example of a "vehicle control device."

For example, the camera 10 is a digital camera using a solid-state imaging element such as a charge-coupled device (CCD) or a complementary metal oxide semiconductor (CMOS). The camera 10 is attached to any location on the vehicle (hereinafter referred to as a vehicle M) in which the vehicle system 1 is mounted. When the view in front of the vehicle M is imaged, the camera 10 is attached to an upper part of a front windshield, a rear surface of a rearview mirror, or the like. For example, the camera 10 periodically and iteratively images the surroundings of the vehicle M. The camera 10 may be a stereo camera.

The radar device 12 radiates radio waves such as millimeter waves around the vehicle M and detects at least a position (a distance to and a direction) of a physical object by detecting radio waves (reflected waves) reflected by the physical object. The radar device 12 is attached to any location on the vehicle M. The radar device 12 may detect a position and a speed of the physical object in a frequency-modulated continuous wave (FM-CW) scheme.

The LIDAR sensor 14 radiates light to the vicinity of the vehicle M (or electromagnetic waves having a wavelength close to that of light) and measures scattered light. The LIDAR sensor 14 detects a distance from an object on the basis of time from light emission to light reception. The radiated light is, for example, pulsed laser light. The LIDAR sensor 14 is attached to any location on the vehicle M.

The physical object recognition device 16 performs a sensor fusion process on detection results from some or all of the camera 10, the radar device 12, and the LIDAR sensor 14 to recognize a position, a type, a speed, and the like of a physical object. The physical object recognition device 16 outputs recognition results to the driving assistance device 100. The physical object recognition device 16 may output detection results of the camera 10, the radar device 12, and the LIDAR sensor 14 to the driving assistance device 100 as they are. The physical object recognition device 16 may be omitted from the vehicle system 1.

The communication device 20 communicates with another vehicle located in the vicinity of the vehicle M, using, for example, a cellular network or a Wi-Fi network, Bluetooth (registered trademark), dedicated short range communication (DSRC), or the like, or communicates with various types of server devices via a radio base station.

The HMI 30 presents various types of information to an occupant of the vehicle M and receives an input operation by the occupant. The HMI 30 includes various types of display devices, a speaker, a buzzer, a touch panel, a switch, keys, and the like. The HMI 30 includes a display device. The display device (display) is, for example, a display device, i.e., a multi-information display, for displaying various information in the vehicle M such as a speedometer indicating a traveling speed of the vehicle M or a tachometer indicating a rotational speed of the internal combustion engine provided in the vehicle M provided in the center of the instrument panel of the vehicle M.

The vehicle sensor 40 includes a vehicle speed sensor configured to detect the speed of the vehicle M, an acceleration sensor configured to detect acceleration, a yaw rate sensor configured to detect angular velocity around a vertical axis, a direction sensor configured to detect a direction of the vehicle M, and the like.

For example, the navigation device 50 includes a global navigation satellite system (GNSS) receiver 51, a navigation HMI 52, and a route decider 53. The navigation device 50 stores first map information 54 in a storage device such as a hard disk drive (HDD) or a flash memory. The GNSS receiver 51 identifies a position of the vehicle M on the basis of a signal received from a GNSS satellite. The position of the vehicle M may be identified or complemented by an inertial navigation system (INS) using an output of the vehicle sensor 40. The navigation HMI 52 includes a display device, a speaker, a touch panel, keys, and the like. The navigation HMI 52 may be partly or wholly shared with the above-described HMI 30. For example, the route decider 53 decides on a route (hereinafter referred to as a route on a map) from the position of the vehicle M identified by the GNSS receiver 51 (or any input position) to a destination input by the occupant using the navigation HMI 52 with reference to the first map information 54. The first map information 54 is, for example, information in which a road shape is expressed by a link indicating a road and nodes connected by the link. The first map information 54 may include curvature of a road, point of interest (POI) information, and the like. The route on the map is output to the MPU 60. The navigation device 50 may perform route guidance using the navigation HMI 52 on the basis of the route on the map. The navigation device 50 may be implemented, for example, according to a function of a terminal device such as a smartphone or a tablet terminal possessed by the occupant. The navigation device 50 may transmit a current position and a destination to a navigation server via the communication device 20 and acquire a route equivalent to the route on the map from the navigation server.

For example, the MPU 60 includes a recommended lane decider 61 and stores second map information 62 in a storage device such as an HDD or a flash memory. The recommended lane decider 61 divides the route on the map provided from the navigation device 50 into a plurality of blocks (for example, divides the route every 100 [m] in a travel direction of the vehicle), and decides on a recommended lane for each block with reference to the second map information 62. The recommended lane decider 61 decides in what lane numbered from the left the vehicle will travel. The recommended lane decider 61 decides on the recommended lane so that the vehicle M can travel along a reasonable route for traveling to a branching destination when there is a branch point on the route on the map.

The second map information 62 is map information with higher accuracy than the first map information 54. The second map information 62 includes, for example, information about a center of a lane, information about a boundary of the lane, or the like. The second map information 62 may include road information, traffic regulation information, address information (address/postal code), facility information, telephone number information, and the like. The second map information 62 may be updated at any time by the communication device 20 communicating with other devices. The second map information 62 includes information such as a position of a curved road, the curvature of the curved road, a curve radius of the curved road, and a gradient of the curved road. This information may be included in the first map information 54. The second map information 62 or the first map information 54 may include information indicating whether or not it is a curved road that is an assistance control target to be described below.

The driver monitor camera 70 is, for example, a digital camera that uses a solid-state image sensor such as a CCD or a CMOS. The driver monitor camera 70 is attached to any location on the vehicle M with respect to a position and a direction where the head of the occupant (hereinafter, the driver) sitting in the driver's seat of the vehicle M can be imaged from the front (in a direction in which his/her face is imaged). For example, the driver monitor camera 70 is attached to an upper part of a display device provided on the central portion of the instrument panel of the vehicle M. The driver monitor camera 70 outputs an image obtained by imaging the cabin including the driver of the vehicle M from an arrangement position to the driving assistance device 100.

The driving operation elements 80 include, for example, a brake pedal 82, an accelerator pedal 84, a steering wheel, a direction indicator operation switch, a shift lever, and other operation elements. A sensor that detects an amount of operation or the presence or absence of operation is attached to the driving operation element 80, and the detection result is output to the driving assistance device 100 or some or all of the travel driving force output device 200, the brake device 210, and the steering device 220. The steering wheel does not necessarily have to be annular and may be in the form of a variant steering wheel, a joystick, a button, or the like. A brake pedal sensor (BP sensor) 86 is attached to the brake pedal 82. An accelerator pedal sensor (AP sensor) 88 is attached to the accelerator pedal 84.

The BP sensor 86 detects an opening degree of the brake pedal 82, which changes with the driver's operation on the brake pedal 82. The AP pedal sensor 88 detects an opening degree of the accelerator pedal that changes with the driver's operation on the accelerator pedal 84.

The driving assistance device 100 includes, for example, a recognizer 110, a driver recognizer 120, a curve determiner 130, an operation information processor 140, an assistance controller 150, and a storage 190. Some or all of these functional elements are implemented, for example, by a hardware processor such as a central processing unit (CPU) executing a program (software). Also, some or all of the above components may be implemented by hardware (including a circuit; circuitry) such as a large-scale integration (LSI) circuit, an application-specific integrated circuit (ASIC), a field-programmable gate array (FPGA), or a graphics processing unit (GPU) or may be implemented by software and hardware in cooperation. The program may be pre-stored in a storage device (a storage device including a non-transitory storage medium) such as an HDD or a flash memory of the driving assistance device 100 or may be stored in a removable storage medium such as a DVD or a CD-ROM and installed in an HDD or a flash memory of the driving assistance device 100 when the storage medium (the non-transitory storage medium) is mounted in a drive device. The curve determiner 130 is an example of a first acquirer, the operation information processor 140 is an example of a second acquirer, and the assistance controller 150 is an example of a controller.

The storage 190 is implemented by an HDD, a flash memory, an electrically erasable programmable read-only memory (EEPROM), a read-only memory (ROM), a random-access memory (RAM), or the like.

On the basis of information input from the camera 10, the radar device 12, and the LIDAR sensor 14 via the physical object recognition device 16, the recognizer 110 recognizes a state of a position, velocity, acceleration, and the like of a physical object in the vicinity of the vehicle M. The position of the physical object, for example, is recognized as a position of an absolute coordinate system having a representative point of the vehicle M (a center of gravity, a drive shaft center, or the like) as the origin, and is used for control. The position of the physical object may be represented by a representative point such as the center of gravity or a corner of the physical object or may be represented in a region. The "state" of the physical object may include the acceleration or jerk of the physical object, or the "action state" (for example, whether or not the lane is changing or is about to change).

Also, for example, the recognizer 110 recognizes a lane in which the vehicle M is traveling (a travel lane). For example, the recognizer 110 recognizes the travel lane by comparing a pattern of road markings (for example, an arrangement of solid lines and broken lines) obtained from the second map information 62 with a pattern of road markings in the vicinity of the vehicle M recognized from an image captured by the camera 10. The recognizer 110 may recognize a travel lane by recognizing a runway boundary (road boundary)

including a road marking, a shoulder, a curb, a median strip, a guardrail, and the like as well as a road marking. In this recognition, a position of the vehicle M acquired from the navigation device 50 or a processing result of the INS may be taken into account. The recognizer 110 recognizes a temporary stop line, an obstacle, red traffic light, a toll gate, and other road events.

When the travel lane is recognized, the recognizer 110 recognizes a position or an orientation of the vehicle M with respect to the travel lane. For example, the recognizer 110 may recognize a gap of a reference point of the vehicle M from the center of the lane and an angle formed between the travel direction of the vehicle M and a line connected to the center of the lane as a relative position and orientation of the vehicle M related to the travel lane. Alternatively, the recognizer 110 may recognize a position of the reference point of the vehicle M related to one side end portion (a road marking or a road boundary) of the travel lane or the like as a relative position of the vehicle M related to the travel lane.

The driver recognizer 120 detects whether or not the driver is in a predetermined state on the basis of the image captured by the driver monitor camera 70. The predetermined state is a state in which hands-off lane keeping control to be described below can be executed. Hands-off is a state in which the driver is not gripping the steering wheel and hands-on is a state in which the driver is gripping the steering wheel. The state in which hands-off lane keeping control can be executed is a state in which the driver is monitoring the front (or the vicinity of the vehicle M). Forward monitoring indicates, for example, that the driver monitors the front so that the driver can quickly makes a change from a state in which the vehicle system 1 controls the vehicle M to a state in which the driver operates the vehicle M. Forward monitoring indicates, for example, that the driver's visual line is facing forward. Whether or not the driver is in a hands-on state or a hands-off state is determined on the basis of a detection result of a grip sensor that detects the gripping state of the steering wheel (not shown).

The curve determiner 130 acquires first information about a curved road located in a travel direction of the vehicle M. The first information about the curved road is, for example, information about a position of the curved road, a shape of the curved road, and the like. The curve determiner 130 identifies, for example, the position of the curved road with respect to the vehicle M on the basis of the position of the vehicle M and the first information.

The operation information processor 140 acquires second information about an acceleration operation of the driver of the vehicle M. The second information is, for example, information indicating an accelerator pedal opening degree output from the AP pedal sensor 88. The operation information processor 140 acquires information about a deceleration operation of the driver of the vehicle M. For example, the operation information processor 140 acquires information indicating a brake pedal opening degree output from the BP sensor 86.

The assistance controller 150 assists the driver in controlling the vehicle M. For example, the assistance controller 150 automatically controls the travel driving force output device 200 and the brake device 210 without depending on the driver's operation, and automatically controls the speed of the vehicle M. The assistance controller 150 executes so-called adaptive cruise control (ACC).

For example, when there is no other vehicle within a predetermined distance from the vehicle M in front of the vehicle M, the assistance controller 150 automatically controls the travel driving force output device 200 and the brake device 210 without depending on the driver's operation so that the vehicle M travels at a speed set by the driver, a legal speed, and a speed preset in accordance with a road.

For example, when there is another vehicle in front of the vehicle M and within a predetermined distance from the vehicle M, the assistance controller 150 automatically controls the travel driving force output device 200 and the brake device 210 without depending on the driver's operation to track the other vehicle. Tracking indicates that the vehicle M is behind the other vehicle and travels while maintaining a position of a predetermined distance from the other vehicle.

The assistance controller 150 controls the steering device 220 so that the vehicle M does not deviate from the travel lane. For example, the assistance controller 150 controls the steering device 220 so that the vehicle M travels in the center of the travel lane recognized by the recognizer 110 or near the center. For example, the assistance controller 150 executes hands-off lane keeping control for controlling the steering of the vehicle M in a state in which the driver is not gripping the steering wheel or hands-on lane keeping control for controlling the steering of the vehicle M in a state in which the driver is gripping the steering wheel.

The assistance controller 150 automatically changes lanes of the vehicle M. For example, the assistance controller 150 generates a trajectory for changing lanes and causes the vehicle M to change lanes so that the vehicle M travels along the generated trajectory. The assistance controller 150 causes the vehicle M to change lanes (auto lane change (ALC)) on the basis of a destination set by an occupant and a recommended lane output to the MPU 60.

The assistance controller 150 may automatically change lanes of the vehicle M when the driver instructs the driver to change lanes. The lane change instruction is an operation on a lever part of an operation switch of the direction indicator. For example, when the driver operates the lever part in a direction in which the vehicle M wants to change lanes, the vehicle M changes lanes in the direction corresponding to the operation. The lane change instruction may be an operation different from the operation of the lever part of the operation switch of the direction indicator. For example, when a predetermined operation button is pressed, a lane change may be performed. A part or all of a control process of the assistance controller 150 may be omitted.

Further, the assistance controller 150 assists the driver so that the vehicle M can travel smoothly on the curved road by decelerating the vehicle M to a speed corresponding to the curved road or providing a notification related to deceleration to the driver when the vehicle M enters the curved road or while the vehicle M is traveling on the curved road. Hereinafter, this control may be referred to as assistance control.

The travel driving force output device 200 outputs a travel driving force (torque) for enabling the traveling of the vehicle M to driving wheels. For example, the travel driving force output device 200 includes a combination of an internal combustion engine, an electric motor, a transmission, and the like, and an electronic control unit (ECU) that controls the internal combustion engine, the electric motor, the transmission, and the like. The ECU controls the above-described components in accordance with information input from the assistance controller 150 or information input from the accelerator pedal of the driving operation element 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the assistance controller 150 or the information input from the driving operation element 80 so that brake torque according to a braking operation is output to each wheel.

For example, the steering device 220 includes a steering ECU and an electric motor. For example, the electric motor changes a direction of steerable wheels by applying a force to a rack and pinion mechanism. The steering ECU drives the electric motor in accordance with the information input from the assistance controller 150 or the information input from the driving operation element 80 to change the direction of the steerable wheels.

[Assistance Control]

While the vehicle M is traveling in a segment (predetermined segment) from an entrance to the curved road to a position a predetermined distance before the entrance or while the vehicle M is traveling on the curved road, the assistance controller 150 performs assistance control that is one or both of deceleration control for decelerating the vehicle M so that a speed of the vehicle M approaches a target speed corresponding to the curved road and notification control for notifying (warning) that the speed of the vehicle M approaches the target speed. The assistance control is, for example, a process to be executed when the driving assistance device 100 does not automatically control the speed of the vehicle M (for example, ACC is not activated) and the driver controls the speed of the vehicle M. The target speed is a speed determined according to a shape of the curved road, a legal speed of the curved road, or the like.

A target of assistance control may be a curved road that satisfies a condition. The condition is, for example, that a curve radius is within a predetermined range. The predetermined range is a curve radius at which deceleration is required when the vehicle M is traveling.

The assistance control may be performed on the condition that the speed of the vehicle M is less than or equal to a predetermined speed. The predetermined speed is a speed that does not deviate from the speed limit or recommended speed of the curved road or the road before or after the curved road by a predetermined speed or more. The predetermined speed is, for example, a speed obtained by adding a set speed (for example, 30 km/h) to the above speed limit or recommended speed.

The assistance control may be performed when the condition of the road surface satisfies a criterion. Satisfying the criterion indicates that, for example, there is no event that affects the braking operation, such as the road surface not being frozen. For example, the recognizer 110 may recognize a road surface situation on the basis of a detection result of the physical object recognition device 16 or the driving assistance device 100 may recognize a road surface situation on the basis of information provided by the other device. The assistance control may be performed when a gradient of the curved road is less than a threshold value.

Figure 2:
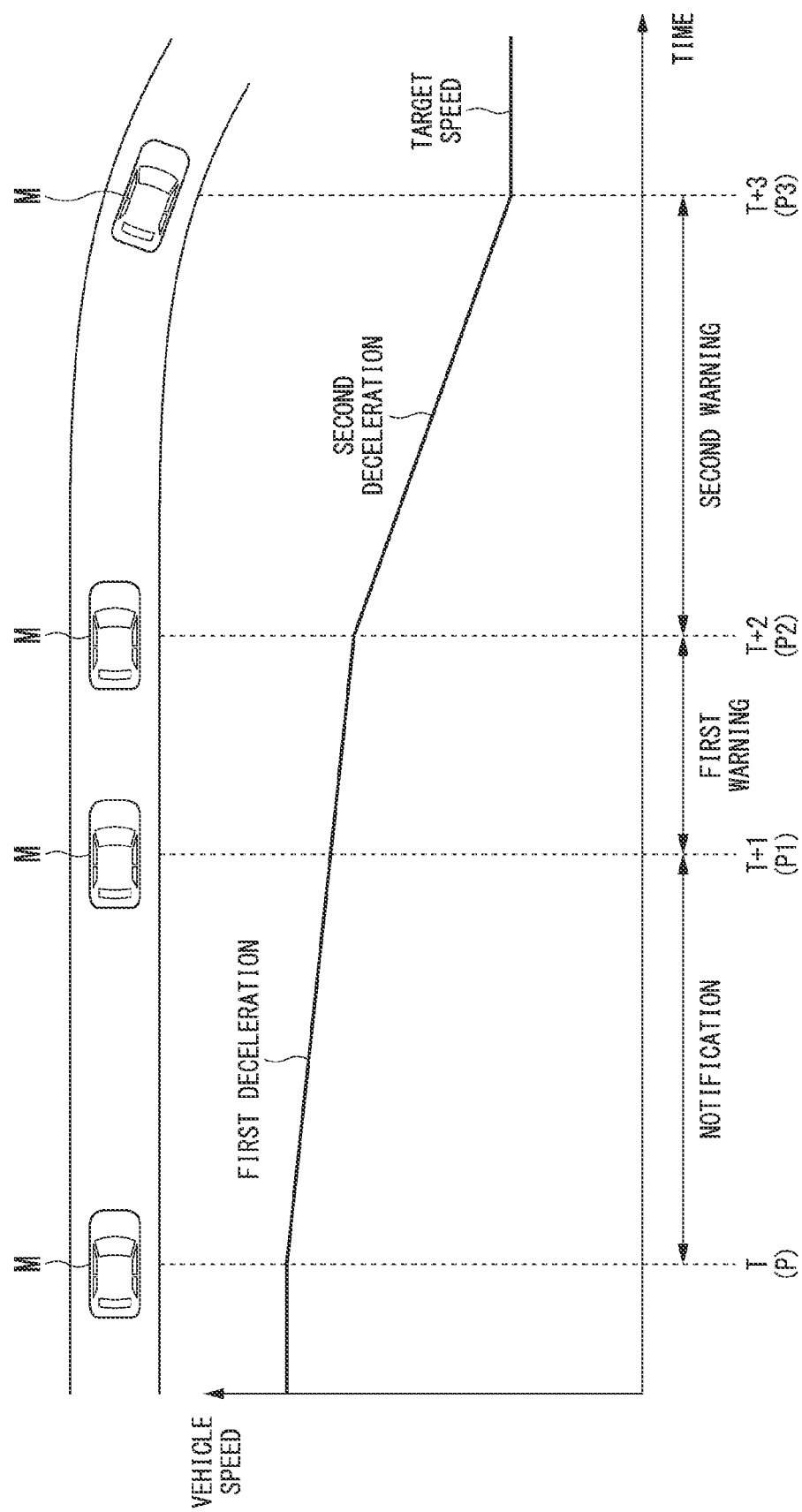
FIG. 2 is a diagram showing an example of driving assistance control.

FIG. 2 is a diagram for describing the assistance control. Time T is a timing when the vehicle M reaches a position P the predetermined distance before the entrance to the curved road. The position the predetermined distance before is a preset position according to the target speed. For example, the position the predetermined distance before is set as a position farther from the entrance to the curved road when the deviation between the speed of the vehicle M and the target speed is larger. The position the predetermined distance before is set as a position where the time when a preset notification is performed, the time when a preset first warning is performed, and the time when a preset second warning is performed can be secured when a brake override or an accelerator override is not performed as described below.

After passing the position P, the vehicle M passes positions P1, P2, and P3 in that order. The time at which the vehicle M reaches the position P is time T, the time at which the vehicle M reaches the position P1 is time T+1, the time at which the vehicle M reaches the position P2 is time T+2, and the time at which the vehicle M reaches the position P3 is time T+3. The entrance to the curved road is provided between the position P2 and the position P3. The entrance to the curved road is, for example, a position where the road (lane) begins to bend or a position where the road has a curvature of a threshold value or more.

At time T, when the speed of the vehicle M is greater than the target speed, the assistance controller 150 provides a notification to the driver and decelerates the vehicle M at a first deceleration degree. The notification is a notification that makes the driver aware of the curved road. Examples of the notification include a notification that the vehicle M has approached a curved road in a state in which the speed of the vehicle Mis greater than the target speed or a notification for starting assistance control for decelerating the vehicle M so that the speed of the vehicle M approaches the target speed. The notification is performed, for example, via the HMI 30. The notification may be an image notification, or a voice or vibration notification (for example, vibrating a seat belt).

At time T+1, the assistance controller 150 performs a first warning for the driver. The first warning is a warning that makes the driver aware of the curved road. The first warning is, for example, a warning for the driver, and is a warning to decelerate the vehicle M so that the speed of the vehicle M approaches the target speed.

The assistance controller 150 performs a second warning for the driver at time T+2, decelerates the vehicle M at a second deceleration degree, and causes the speed of the vehicle M to match the target speed at time T+3. The second deceleration degree is a deceleration degree greater than the first deceleration degree. The second warning is a warning that makes the driver aware of the curved road. The second warning is a warning for the driver, and is a warning to decelerate the vehicle M so that the speed of the vehicle M approaches the target speed. The second warning is a warning stronger than the first warning. The stronger warning is a warning that makes the driver feel the need to decelerate more. For example, for the stronger warning, the assistance controller 150 provides an image that prompts the driver to decelerate, outputs a louder sound, or gives a larger vibration to the driver.

As described above, the assistance controller 150 provides assistance for the vehicle M to travel on a curved road. Thereby, it is possible to assist the driver in operating so that the vehicle M travels smoothly on the curved road at the target speed.

[Override of Deceleration Operation]

When the driver operates the brake pedal 82 to a predetermined operation degree or more while the assistance control is being performed, the assistance controller 150 causes the vehicle M to decelerate by stopping the assistance control and controlling the brake device 210 in accordance with the driver's operation. Hereinafter, this control may be referred to as a brake override.

Figure 3:
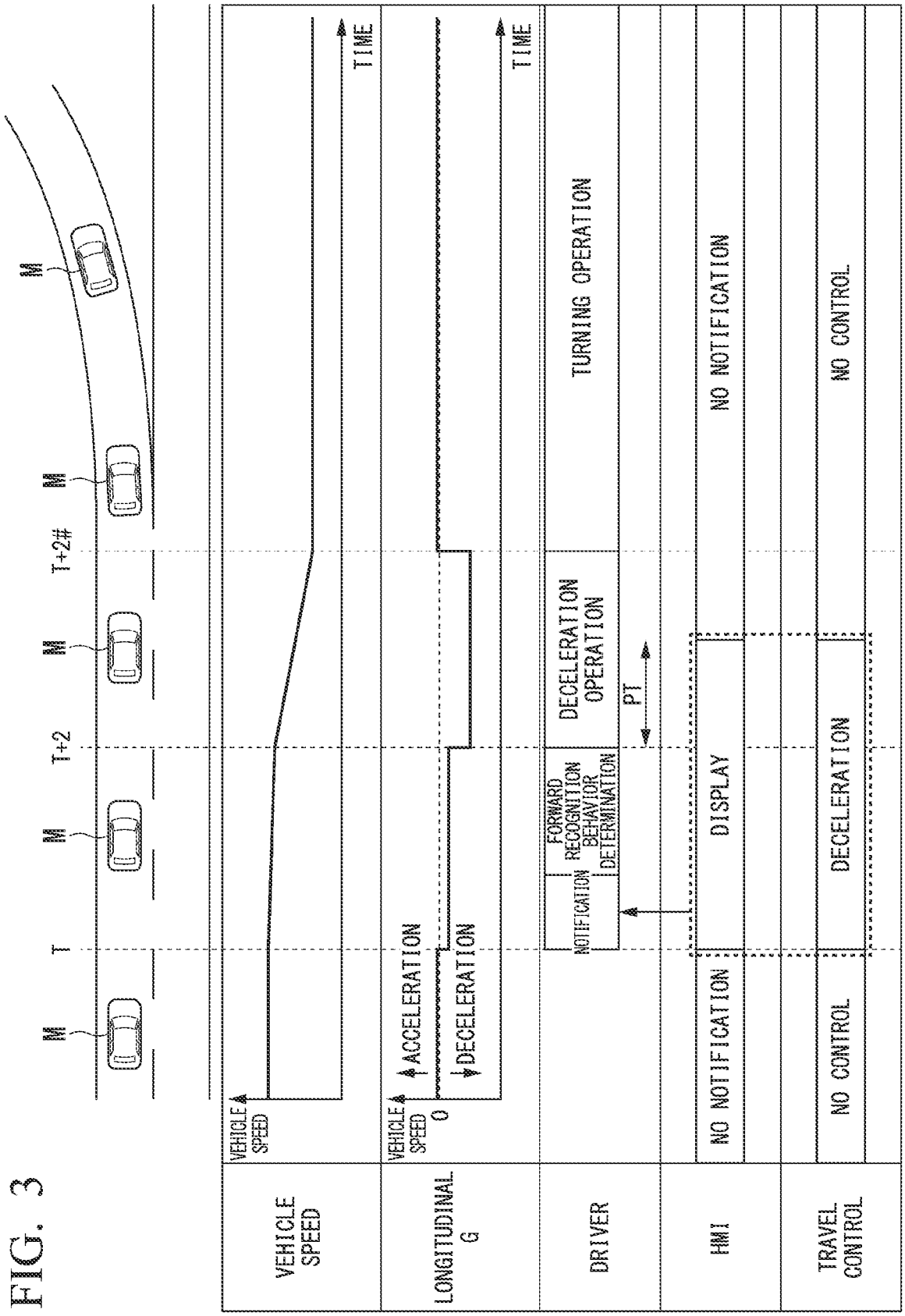
FIG. 3 is a diagram for describing a brake override.

FIG. 3 is a diagram for describing the brake override. Between time T and time T+2, the assistance controller 150 decelerates the vehicle M at a first deceleration degree and provides a notification or a first warning via the HMI 30. The driver detects a change in gravity (longitudinal G) in the travel direction of the vehicle M as the vehicle M decelerates and further recognizes that the vehicle M is approaching a curved road according to the notification or the first warning via the HMI. When the driver operates the brake pedal 82 at a predetermined operation degree or more for a predetermined time PT (for example, 2 sec, 3 sec, or the like) according to the above-described recognition, the assistance control stops at time T+2 #. When the brake pedal 82 is operated as described above, the assistance controller 150 considers that the driver recognizes the curved road and is trying to decelerate the vehicle M to a speed corresponding to the curved road, and stops the assistance control. Thereby, the notification or warning is stopped and a deceleration control process of the assistance controller 150 is further stopped.

For example, even if the curved road is not recognized, the driver may reflexively operate the brake pedal 82 according to a notification or warning. In this case, it is not appropriate to perform a brake override. In the present embodiment, as described above, when the driver operates the brake pedal 82 at the predetermined operation degree or more and for the predetermined time PT, the assistance control is stopped, such that it is possible to cause the brake override to be established after the driver is allowed to recognize the curved road. Thus, the assistance controller 150 can stop the assistance control at an appropriate timing.

[Override of Acceleration Operation]

The assistance controller 150 accelerates the vehicle M at first acceleration in a case where information indicating that the driver has performed an acceleration operation has been acquired when the vehicle M is not traveling in the above-described predetermined segment or on the above-described curved road and the assistance control is not operating and accelerates the vehicle M at second acceleration that is suppressed as compared with the first acceleration by ending assistance control in a case where information indicating that the driver has performed the above-described acceleration operation has been acquired when the assistance control is being performed. Hereinafter, this control may be referred to as an accelerator override.

Figure 4:
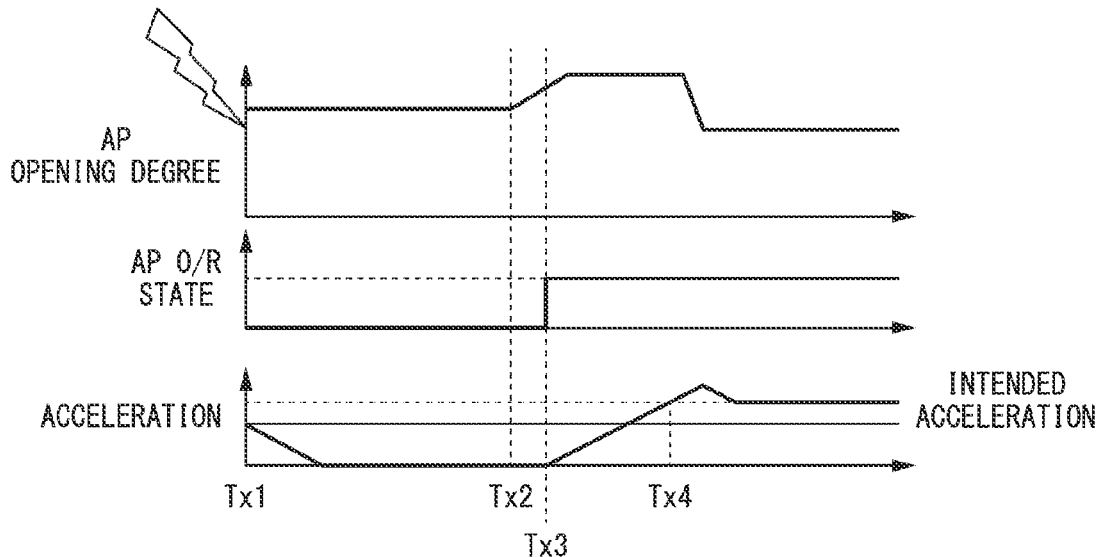
FIG. 4 is a diagram for describing an override of an acceleration operation.

FIG. 4 is a diagram for describing the override of the acceleration operation. At time Tx1, the assistance controller 150 starts the assistance control and starts decelerating the vehicle M. At time Tx2, the driver starts operating the accelerator pedal 84 to accelerate the vehicle M. At time Tx3, when the operation of the accelerator pedal 84 satisfies the condition of the accelerator override (AP O/R state), the assistance controller 150 accelerates the vehicle M at the second acceleration until the acceleration of the vehicle M reaches predetermined acceleration. In the example of FIG. 4, in a period from time Tx3 to time Tx4, the assistance controller 150 accelerates the vehicle M at the second acceleration. The condition for the accelerator override may be that a condition to be described below is satisfied or that the accelerator pedal opening degree reaches a threshold value.

The predetermined acceleration is, for example, acceleration corresponding to the accelerator pedal opening degree when the acceleration is not suppressed as described above. In other words, it is the original acceleration of the vehicle M corresponding to the accelerator pedal opening degree (an amount of operation on the accelerator pedal). As the operation amount of the driver's accelerator pedal increases, the predetermined acceleration increases. As the operation amount of the driver's accelerator pedal decreases, the predetermined acceleration decreases. Thus, the assistance controller 150 accelerates the vehicle M until it reaches acceleration corresponding to the amount of operation on the accelerator pedal.

Figure 5:
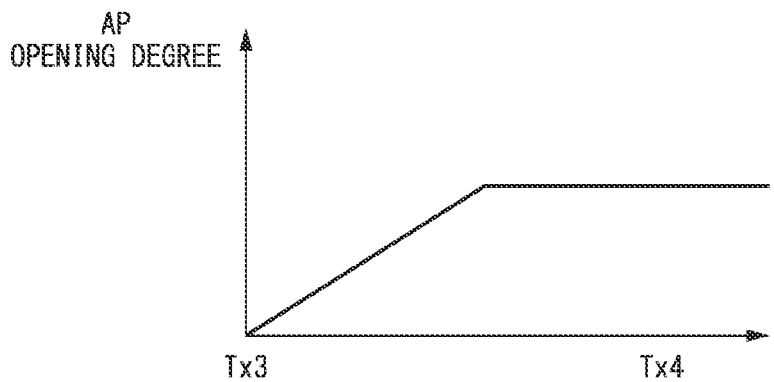
FIG. 5 is a diagram for describing an accelerator pedal opening degree based on an operation of a driver.

The first acceleration and the second acceleration will be described with reference to FIGS. 5 and 6. FIG. 5 is a diagram for describing an accelerator pedal opening degree based on an operation of the driver. The vertical axis represents an accelerator pedal opening degree and the horizontal axis represents time. For example, in the case where it is assumed that assistance control has been executed (in the case of pattern 1) and in the case where it is assumed that assistance control has not been executed (in the case of pattern 2), it is assumed that the driver operates the accelerator pedal and the accelerator pedal opening degree changes as shown in FIG. 5. The change in the accelerator pedal opening degree from time Tx3 to time Tx4 is shown. In this case, the acceleration changes as shown in FIG. 6.

Figure 6:
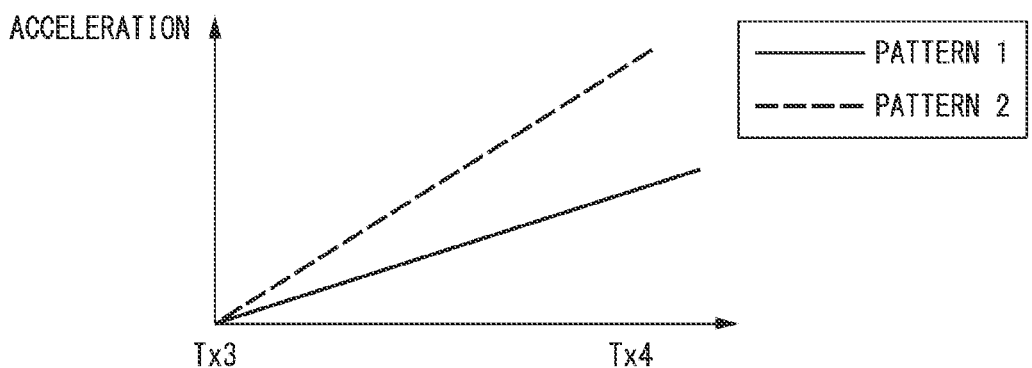
FIG. 6 is a diagram for describing acceleration changes in pattern 1 and pattern 2.

FIG. 6 is a diagram for describing changes in acceleration of pattern 1 and pattern 2. The vertical axis represents acceleration and the horizontal axis represents time. The acceleration of pattern 1 (second acceleration) is suppressed as compared with the acceleration of pattern 2 (first acceleration). Even if the accelerator pedal opening degree changes similarly in pattern 1 and pattern 2, the increase in acceleration in pattern 1 is suppressed as compared with pattern 2 and a control process is performed so that the speed of the vehicle M reaches the predetermined speed over time as compared with the case of pattern 2.

The acceleration of the above-described pattern 1 is, for example, acceleration at which the driver can suppress an acceleration process within a predetermined time even if the acceleration process unintended by the driver is performed. For example, when the unintentional acceleration process has been performed, the movement time until the driver removes the foot on the accelerator pedal from the accelerator pedal and moves the foot to the brake pedal 82 is considered. The acceleration of pattern 1, for example, is set to acceleration at which an acceleration process can be suppressed within a predetermined time (the vehicle M can be decelerated) when the brake operation is performed after the movement time as described above or less.

The acceleration of pattern 2 is an example of "the first acceleration when the second information has been acquired when the vehicle is not traveling in the segment or on the curved road and the assistance control is not operating." The acceleration of pattern 1 is an example of "the second acceleration when the second information is acquired while the assistance control is being performed, wherein the second acceleration is suppressed as compared with the first acceleration by ending the assistance control."

The acceleration of pattern 1 described above may be acceleration that is suppressed as compared with acceleration of a case where an override is established when ACC is executed. For example, in a case where the operation on the accelerator pedal 84 satisfies the condition when ACC is executed, the assistance controller 150 stops the ACC and accelerates the vehicle M according to the driver's operation on the accelerator pedal 84. The acceleration at this time may be acceleration greater than the acceleration of pattern 1.

The assistance controller 150 may adjust the acceleration of pattern 1 in accordance with the operation mode of the driver's accelerator pedal during a set period. The assistance controller 150 adjusts the acceleration of pattern 1 in accordance with the operation amount or operation speed of the driver's accelerator pedal during the set period. The set period is one of a period before the accelerator override is established, a period in which the accelerator override is established, and a period after the accelerator override is established, a combination of these periods, and a period including these periods.

For example, an adjustment is made so that the acceleration of pattern 1 is close to the acceleration of pattern 2 as the operation speed increases. For example, an adjustment is made so that the acceleration of pattern 1 is close to the acceleration of pattern 2 as the operation amount increases. The assistance controller 150 adjusts the acceleration by adding a gain corresponding to the operation speed or the operation amount to the acceleration of pattern 1. Thereby, the assistance controller 150 can implement a process of controlling the vehicle M to reflect the driver's intention.

The assistance controller 150, for example, causes the acceleration of the vehicle M to reach the target acceleration at a first time by accelerating the vehicle M at the first acceleration in a case where the second information indicating that a first acceleration operation has been performed to cause the acceleration of the vehicle M to approach the target acceleration has been acquired when the vehicle M is not traveling near the curved road or on the curved road and the assistance control is not operating. The assistance controller 150 causes the acceleration of the vehicle M to reach the target acceleration at a second time after the first time by ending the assistance control and accelerating the vehicle M at the second acceleration that is suppressed as compared with the first acceleration in a case where the second information indicating that the first acceleration operation has been performed has been acquired when the assistance control is being performed. Thus, when an accelerator override has been established, the assistance controller 150 further suppresses the acceleration and controls the acceleration of the vehicle M so that the acceleration of the vehicle M approaches the acceleration intended by the driver (across a long period of time) smoothly. Thereby, the assistance controller 150 can suppress the acceleration of the vehicle M from deviating from the target acceleration and can reliably make the acceleration of the vehicle M close to the acceleration intended by the driver.

Comparative Example

Figure 7:
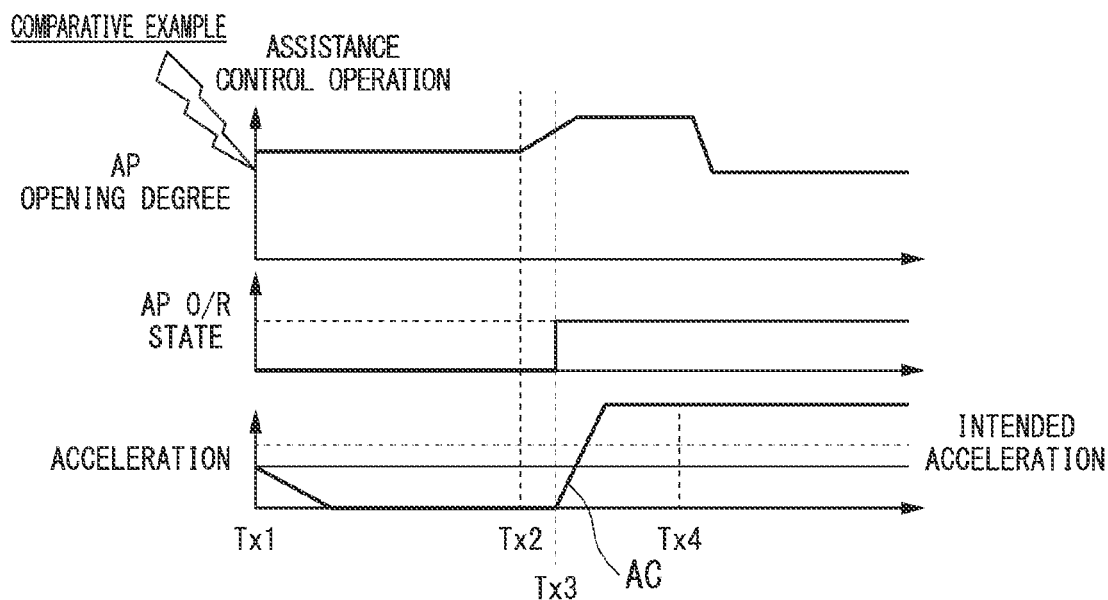
FIG. 7 is a diagram for describing a change in acceleration when acceleration is not suppressed.

FIG. 7 is a diagram for describing a change in acceleration when acceleration is not suppressed. As shown in FIG. 7, when the acceleration is not suppressed, the vehicle M may accelerate at acceleration greater than the acceleration intended by the driver. Between time Tx2 and time Tx3, the driver may depress the accelerator pedal more strongly because the driver is depressing the accelerator pedal but acceleration is suppressed according to the assistance control. As a result, the accelerator pedal override is established, and the vehicle M may accelerate at acceleration exceeding the acceleration intended by the driver (AC in FIG. 7).

On the other hand, in the present embodiment, as described in FIGS. 4 to 6, the assistance controller 150 can accelerate the vehicle M at the acceleration intended by the driver because the acceleration is suppressed in the accelerator override of the assistance control. As a result, the assistance controller 150 can implement a process of controlling the vehicle M corresponding to the driver's intention.

[Condition of Accelerator Override]

The assistance controller 150 stops the assistance control and accelerates the vehicle M when operation information indicating one or both of an amount of operation of the driver on the accelerator pedal and a speed of operation on the accelerator pedal satisfies a condition. The condition is, for example, any of (1) to (3).

(1) The operation amount during a predetermined period reaches a first threshold value.

(2) The accelerator pedal is operated at the operation speed greater than or equal to a second threshold value and the operation amount reaches a third threshold value. For example, (2) is valid when the driver kicks down the accelerator pedal. The third threshold value is, for example, a threshold value greater than the first threshold value.

(3) An operation of the operation amount greater than or equal to a fourth threshold value is performed a plurality of times. The fourth threshold value is, for example, a threshold value greater than the first threshold value.

The above-described (1) may be determined on the basis of the cumulative value of the amount of operation on the accelerator pedal. The assistance controller 150 establishes an accelerator override when a cumulative change amount (operation amount) of the accelerator pedal opening degree in a predetermined time has reached a threshold value. The cumulative change amount is, for example, the change amount (operation amount) of the accelerator pedal opening degree corresponding to the fact that the accelerator pedal 84 is operated to accelerate the vehicle M. The cumulative change amount is, for example, a cumulative value of an amount of depression on the accelerator pedal 84 depressed by the driver. As described above, the assistance controller 150 establishes an accelerator override when the accelerator pedal 84 is operated with an operation amount greater than or equal to a predetermined degree and the cumulative depression amount has reached a threshold value within the predetermined time.

Figure 8:
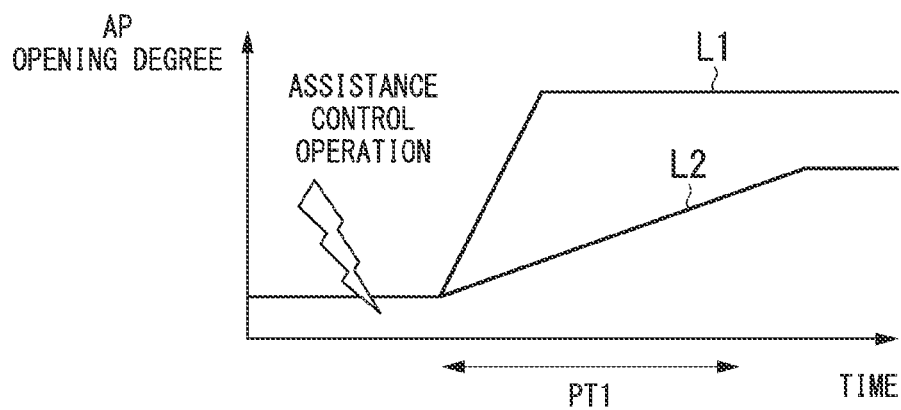
FIG. 8 is a diagram for describing conditions for an accelerator override.

FIG. 8 is a diagram for describing conditions for the accelerator override. The vertical axis represents an accelerator pedal opening degree and the horizontal axis represents time. The assistance controller 150 accumulates an operation amount of an operation on the accelerator pedal 84 for accelerating the vehicle M from the time when the accelerator pedal 84 is operated to accelerate the vehicle M to the time when a set period PT1 elapses and stops the assistance control when the accumulated operation amount has reached a threshold value. The starting point of the set period PT1 may be the time when the driver operates the accelerator pedal 84 or the time when the driver operates the accelerator pedal 84 with a predetermined operation amount or more. As described above, the accelerator override is established. When the accumulated operation amount does not reach the threshold value before the set period PT1 elapses, the assistance control continues even if the driver is operating the accelerator pedal 84.

The condition of the accelerator override is satisfied even if the accelerator pedal 84 is operated so that the accelerator pedal opening degree significantly changes in a short period of time as in a change line L1 and even if the accelerator pedal 84 is operated so that the accelerator pedal opening degree is gently accumulated and changed by a predetermined degree or more as in a change line L2. When the accelerator pedal 84 is depressed by the driver, then released, and then immediately depressed by the driver again, the accelerator override is established if the cumulative amount of change (depression amount) in the two operations (a plurality of operations) is greater than or equal to a threshold value.

Comparative Example

Figure 9:
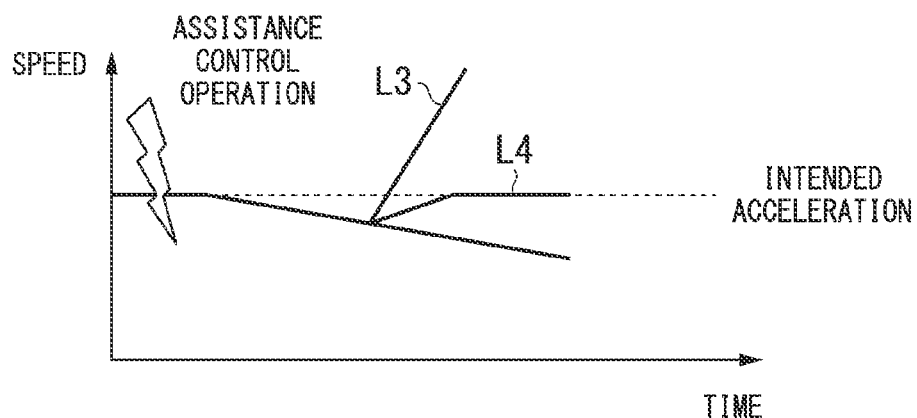
FIG. 9 is a diagram for describing a speed of a vehicle according to an operation on an accelerator pedal in a comparative example.

FIG. 9 is a diagram for describing the speed of the vehicle M corresponding to the operation on the accelerator pedal 84 in a comparative example. The vertical axis represents a speed of the vehicle M and the horizontal axis represents time. The driver may desire to perform an accelerator override so that the vehicle M is allowed to travel without performing deceleration after the assistance control is started. In this case, the driver assumes the following things. "If the vehicle M is desired to travel at acceleration as in the change line L4 but the accelerator pedal 84 is operated at an operation degree of a certain amount so that a magnitude of the accelerator pedal opening degree is greater than or equal to the threshold value (so that the accelerator override is established), the acceleration may be performed at more than an intended speed as in the change line L3." For the above consideration, the driver may hesitate to operate the accelerator pedal 84 for the accelerator override.

In the present embodiment, the assistance controller 150 can control the vehicle M so that its speed gradually approaches an intended speed without becoming a speed as in the change line L3 of FIG. 9 even if the driver operates the accelerator pedal 84 at an operation degree of a certain amount to suppress the acceleration as described with reference to FIGS. 4 to 6. Thereby, a process of controlling the vehicle M corresponding to the driver's intention can be implemented.

For example, the driver does not assume that acceleration is suppressed and the accelerator pedal 84 may be gradually operated with an operation amount smaller than a certain amount as in the change line L2 of FIG. 8 described above without operating the accelerator pedal 84 at an operation degree of the certain amount. In this case, the assistance controller 150 establishes an accelerator override when the cumulative amount of change in the accelerator pedal opening degree within a specified time is greater than or equal to a threshold value. Thereby, a process of controlling the vehicle M according to the driver's intention can be implemented.

[Flowchart]

Figure 10:
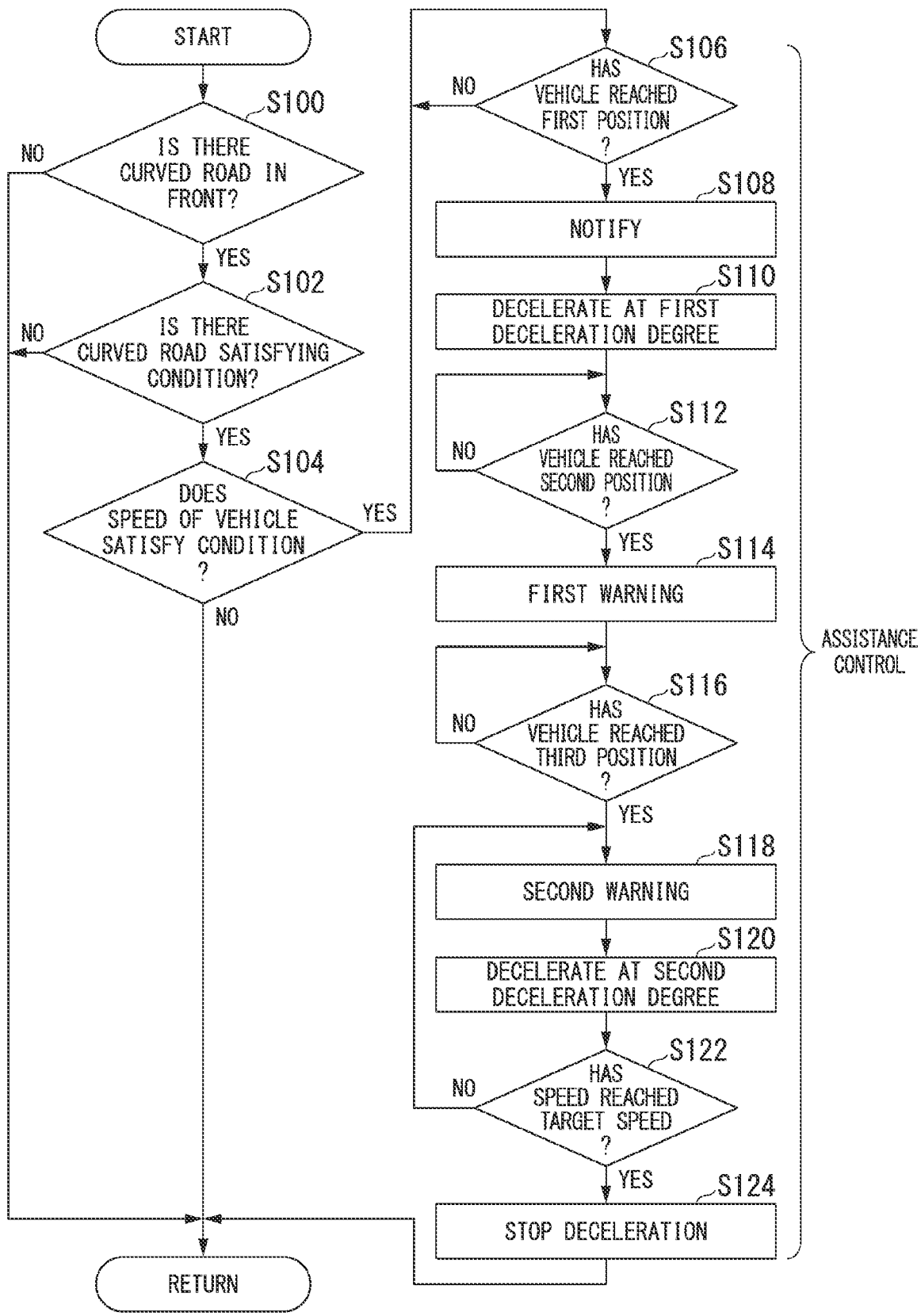
FIG. 10 is a flowchart showing an example of a flow of a process executed by a driving assistance device.

FIG. 10 is a flowchart showing an example of a flow of a process executed by the driving assistance device 100. The order of processing in the present flowchart may be changed or some processing may be omitted.

First, the driving assistance device 100 determines whether or not there is a curved road in front of a predetermined distance from the position of the vehicle M (step S100). When there is a curved road, the driving assistance device 100 determines whether or not the curved road is a curved road that satisfies a condition (step S102). When the curved road is a curved road that satisfies the condition, the driving assistance device 100 determines whether or not a speed of the vehicle M satisfies a condition (step S104). If the determination of step S100, S102, or S104 is negative, the process of one routine of the present flowchart ends.

When the speed of the vehicle satisfies the condition, the driving assistance device 100 determines whether or not the vehicle M has reached a first position (for example, the position P in FIG. 2) (step S106). When the vehicle M has reached the first position, the driving assistance device 100 provides a notification (step S108) and decelerates the vehicle M at a first deceleration degree (step S110).

Subsequently, the driving assistance device 100 determines whether or not the vehicle M has reached a second position (for example, the position P1 in FIG. 2) (step S112). When the vehicle M has reached the second position, the driving assistance device 100 performs a first warning (step S114). Subsequently, the driving assistance device 100 determines whether the vehicle M has reached a third position (for example, the position P2 in FIG. 2) (step S116).

When the vehicle M has reached the third position, the driving assistance device 100 performs a second warning (step S118) and decelerates the vehicle M at a second deceleration degree (step S122). Subsequently, it is determined whether or not the speed of the vehicle M has reached the target speed (step S122). When the speed of the vehicle M has not reached the target speed, the process returns to step S118. When the speed of the vehicle M has reached the target speed, the driving assistance device 100 stops the deceleration of the vehicle M (step S124). Thereby, the process of one routine of the present flowchart ends.

As described above, the driving assistance device 100 can assist the driver so that the vehicle M can travel more smoothly on the curved road by executing assistance control (steps S106 to S124) when the vehicle M and the curved road satisfy a condition.

In the process of the above-described flowchart, when the brake override or accelerator override is established, the assistance control is stopped.

Figure 11:
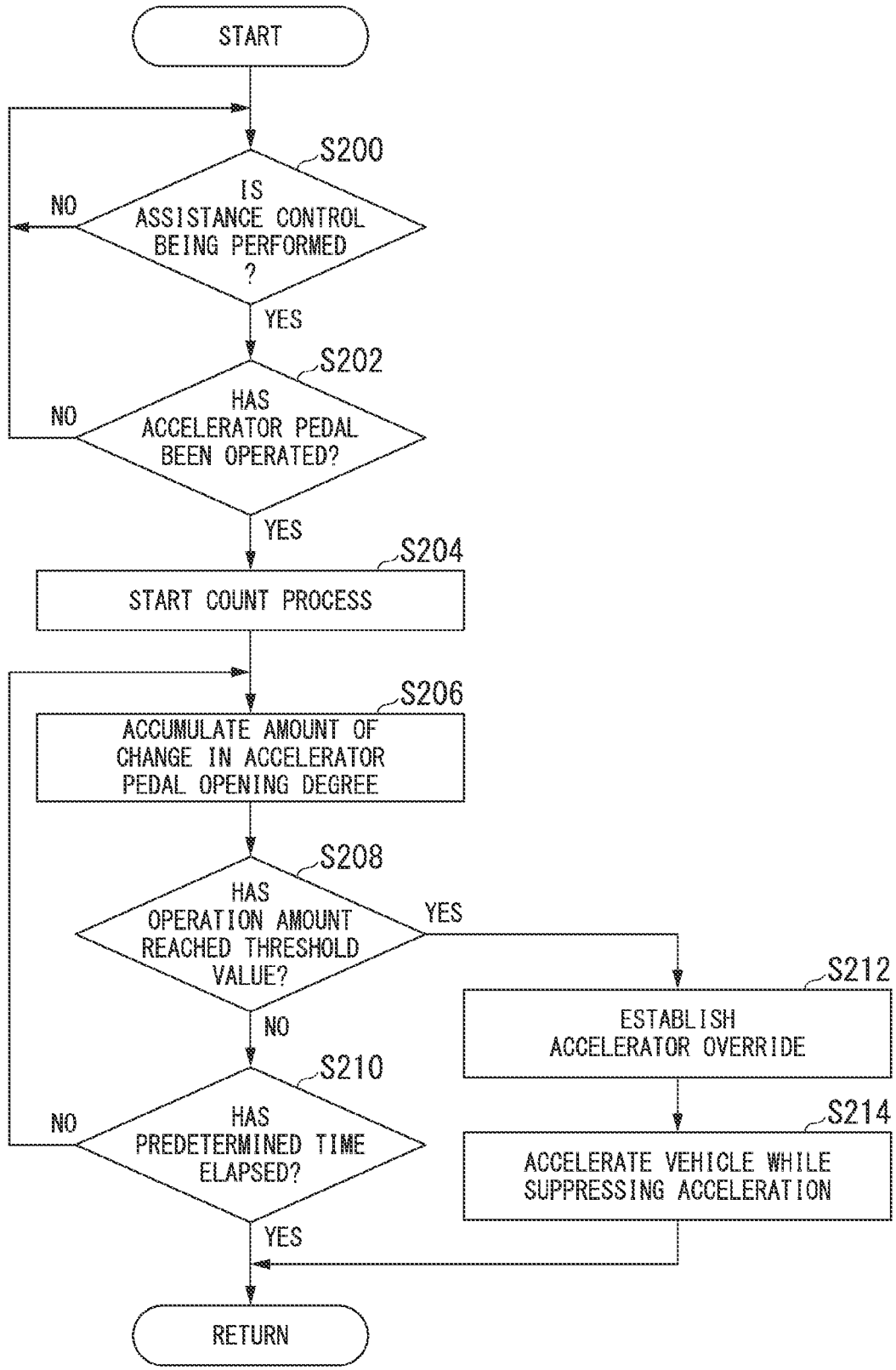
FIG. 11 is a flowchart showing an example of an accelerator override process executed by the driving assistance device.

FIG. 11 is a flowchart showing an example of an accelerator override process executed by the driving assistance device 100. The order of processing in the present flowchart may be changed or some processing may be omitted. For example, the processing of step S214 may be omitted. For example, the processing of steps S204, S206, and S210 may be omitted and it may be determined whether or not an operation amount for the accelerator pedal 84 has reached a threshold value in step S208.

First, the driving assistance device 100 determines whether or not assistance control is being performed (step S200). When assistance control is being performed, the driving assistance device 100 determines whether or not the accelerator pedal 84 has been operated (step S202). When the accelerator pedal 84 has been operated, the driving assistance device 100 starts a count process of a timer (step S204).

Next, the driving assistance device 100 accumulates an amount of change in an accelerator pedal opening degree (step S206). The change amount is a change amount (for example, a depression amount) when the accelerator pedal 84 has been operated to accelerate the vehicle M as described above. Subsequently, the driving assistance device 100 determines whether or not a cumulative value of the amount of change in the accelerator pedal opening degree has reached a threshold value (step S208). When the cumulative value of the amount of change in the accelerator pedal opening degree has not reached the threshold value, the driving assistance device 100 determines whether or not a predetermined time has elapsed from the start of the count process (step S210). When the predetermined time has not elapsed, the process returns to step S206. When the predetermined time has elapsed, the process of one routine of the present flowchart ends.

When the cumulative value of the amount of change in the accelerator pedal opening degree has reached the threshold value in step S208, the driving assistance device 100 establishes an accelerator override (step S212). Thereby, the process of the flowchart of FIG. 10 described above is stopped and the assistance control is stopped. Subsequently, the driving assistance device 100 accelerates the vehicle M while suppressing acceleration according to the accelerator pedal opening degree (step S214). Thereby, the process of one routine of the present flowchart ends.

Because the driving assistance device 100 establishes an accelerator override on the basis of the cumulative value of the amount of change in the accelerator pedal opening degree and further suppresses acceleration when the accelerator override is established as described above, it is possible to implement a process of controlling the vehicle M corresponding to the driver's intention.

According to the above-described embodiment, when the driver performs an acceleration operation while performing assistance control, the assistance controller 150 ends the assistance control and accelerates the vehicle M at the suppressed acceleration, thereby implementing a process of controlling the vehicle M corresponding to the driver's intention.

Second Embodiment

Hereinafter, a second embodiment will be described. In the second embodiment, control of a case where the curved road is downhill will be described. Hereinafter, differences from the first embodiment will be mainly described. The process of the first embodiment and a process of the second embodiment may be appropriately combined.

The assistance controller 150 acquires information of a gradient of a curved road, accelerate a vehicle M at third acceleration by ending assistance control in a case where information about an acceleration operation has been acquired when the gradient is a downward gradient and the assistance control is being performed, and accelerate the vehicle M at second acceleration that has been suppressed by ending the assistance control in a case where information about an acceleration operation has been acquired when the curved road does not have a downward gradient or the curved road is a flat road and the assistance control is being performed. The third acceleration is acceleration that is suppressed as compared with the second acceleration.

Figure 12:
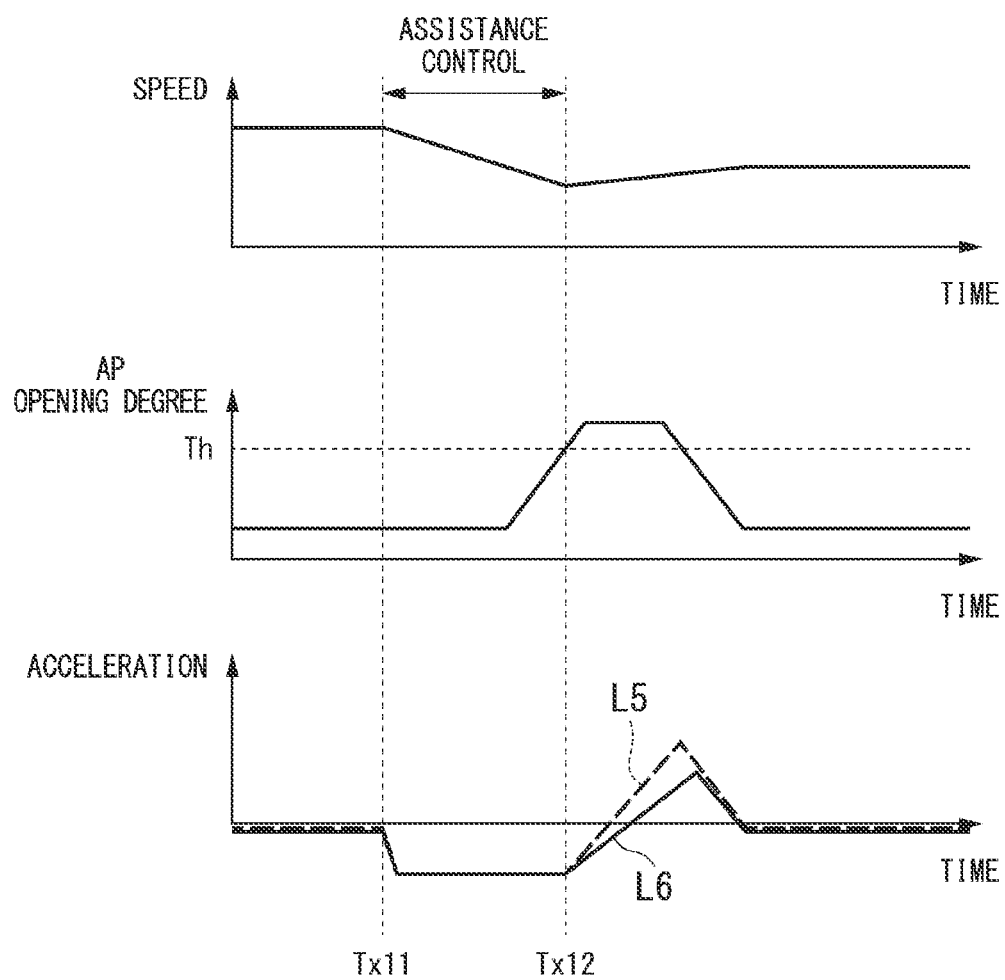
FIG. 12 is a diagram for describing control when a curved road is downhill.

FIG. 12 is a diagram for describing control when the curved road is downhill. In FIG. 12, changes in the speed of the vehicle M, the accelerator pedal opening degree, and the acceleration of the vehicle M corresponding to time are shown. At time Tx11, assistance control is started. It is assumed that the driver operates the accelerator pedal 84 before time Tx12. At time Tx12, the cumulative value of the amount of change in the accelerator pedal opening degree reaches a threshold value Th and the assistance control stops. At this time, the assistance controller 150 suppresses the acceleration of the vehicle M. For example, the assistance controller 150 suppresses acceleration as compared with an acceleration suppression degree described in the first embodiment (suppresses acceleration to third acceleration that is suppressed as compared with the second acceleration).

A change line L5 in FIG. 12 is a change line of a change in suppressed acceleration described in the first embodiment. A change line L6 of FIG. 12 is a change line of a change in suppressed acceleration when the curved road of the second embodiment is downhill. Thus, the assistance controller 150 suppresses the acceleration of the vehicle M when the curved road is downhill as compared with when the curved road is not downhill.

The assistance controller 150 acquires operation information indicating one or both of an operation amount and an operation speed of the driver for the accelerator pedal 84 and accelerates the vehicle M by stopping the assistance control when the operation information satisfies a condition. For example, when any one of the above-described conditions (1) to (3) is satisfied, the assistance control is stopped. At this time, the condition may be mitigated as the downward gradient increases. Mitigation indicates that conditions are more likely to be satisfied. For example, a threshold value included in the conditions (1) to (3) may be reduced.

In the above-described process, the assistance controller 150 may suppress the third acceleration when the gradient of the curved road is large as compared with when the downward gradient of the curved road is small. For example, the assistance controller 150 makes the gradient of the change line L5 described above gentle as the downward gradient of the curved road increases. Thereby, the assistance controller 150 can implement a process of controlling the vehicle M according to the gradient.

As described in the first embodiment, the assistance controller 150 may adjust the acceleration (acceleration of the change line L5) in accordance with an operation mode of the driver on the accelerator pedal during a set period. The assistance controller 150 adjusts the acceleration in accordance with the operation amount or the operation speed of the driver for the accelerator pedal during the set period. For example, the faster the operation speed, the higher the acceleration, and the larger the operation amount, the higher the acceleration. Thereby, the assistance controller 150 can implement a process of controlling the vehicle M reflecting the driver's intention.

SUMMARY

For example, the acceleration behavior is more likely to give a sense of fear to the driver on a downhill road than on a flat road. In particular, there are drivers who do not desire to decelerate or accelerate and desire to keep the current vehicle speed, but want to release the assistance control. For this driver, operating the accelerator pedal 84 to stop the assistance control may be a psychological load.

In the present embodiment, in order to further alleviate such psychological anxiety, the assistance controller 150 suppresses acceleration on the downhill road more than when it suppresses acceleration on a flat road. Thereby, the vehicle M suppresses the acceleration that the driver feels as a psychological load according to an operation on the accelerator pedal 84. Thereby, a process of controlling the vehicle M in coordination with the driver's operation and intention can be implemented.

[Flowchart]

Figure 13:
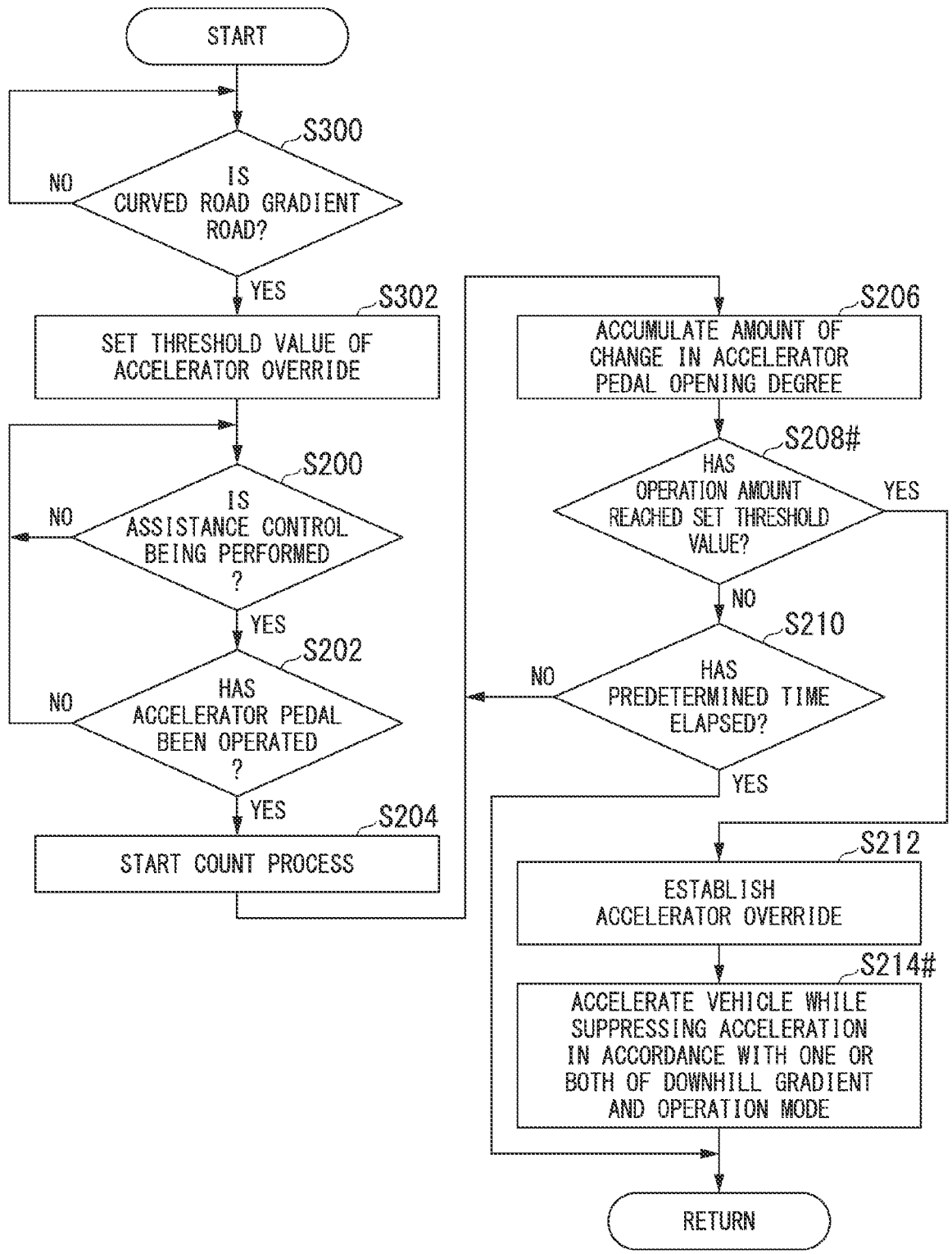
FIG. 13 is a flowchart showing an example of a flow of a process executed by a driving assistance device of a second embodiment.

FIG. 13 is a flowchart showing an example of a flow of a process executed by the driving assistance device 100 of the second embodiment. First, the driving assistance device 100 determines whether or not the curved road is downhill (step S300). When the curved road is downhill, the driving assistance device 100 sets a threshold value of the accelerator override in accordance with a gradient (step S302). Next, the driving assistance device 100 executes the processing of steps S200 to S206 in FIG. 11. After the processing of step S206, the driving assistance device 100 determines whether or not the cumulative value of the amount of change in the accelerator pedal opening degree has reached the threshold value set in step S302 (step S208 #). When the cumulative value of the amount of change in the accelerator pedal opening degree has not reached the threshold value set in step S302, the process proceeds to step S210.

When the cumulative value of the amount of change in the accelerator pedal opening degree has reached the threshold value set in step S302, the driving assistance device 100 establishes an accelerator override (step S212). Subsequently, the driving assistance device 100 accelerates the vehicle M while suppressing the acceleration of the vehicle M according to one or both of the downhill gradient and the operation mode (step S214 #). Thereby, the process of one routine of the present flowchart ends.

According to the above-described second embodiment, the driving assistance device 100 can implement a process of controlling the vehicle M in coordination with the driver's operation and intention.

Modified Examples

Although the case where the assistance controller 150 decelerates the vehicle M before entering the curved road or on the curved road has been described in each of the above-described embodiments, a notification or warning may be performed without deceleration. In this case, the acceleration operation may be taken as a condition to stop the notification or warning. For example, while the vehicle M is traveling in a segment from an entrance to a curved road to a position before a predetermined distance from the entrance or while the vehicle M is traveling on the curved road, the assistance controller 150 may accelerate the vehicle M at first acceleration in a case where information about an acceleration operation has been acquired when assistance control that is notification control for notifying that the speed of the vehicle M is approaching a target speed is performed and assistance control is not operating in a state in which the vehicle M is not traveling in the segment or on the curved road and may accelerate the vehicle M at second acceleration that is suppressed as compared with the first acceleration by ending the assistance control in a case where the information about the acceleration operation has been acquired when the assistance control is being performed.

Thereby, when the driver performs an acceleration operation to accelerate and stop the notification or warning while performing assistance control, the assistance controller 150 can implement a process of controlling the vehicle M corresponding to the driver's intension by ending the assistance control and accelerating the vehicle M at the suppressed acceleration.

The embodiment described above can be represented as follows.

A control device including:
a storage device storing a program; and
a hardware processor, the hardware processor executing the program stored in the storage device to:
acquire first information about a curved road located in a travel direction of a vehicle;
acquire second information about an acceleration operation of a driver of the vehicle; and
while the vehicle is traveling in a segment from an entrance to the curved road to a position a predetermined distance before the entrance or while the vehicle is traveling on the curved road,
perform assistance control that is one or both of deceleration control for decelerating the vehicle so that a speed of the vehicle approaches a target speed based on the first information and notification control for notifying that the speed of the vehicle approaches the target speed,
accelerate the vehicle at first acceleration in a case where the second information has been acquired when the vehicle is not traveling in the segment or on the curved road and the assistance control is not operating, and
accelerate the vehicle at second acceleration that is suppressed as compared with the first acceleration by ending the assistance control in a case where the second information has been acquired when the vehicle is performing the assistance control.

Although modes for carrying out the present invention have been described above using embodiments, the present invention is not limited to the embodiments and various modifications and substitutions can also be made without departing from the scope and spirit of the present invention.

What is claimed is:

1. A vehicle control device comprising:
a storage medium storing computer-readable instructions; and
one or more processors connected to the storage medium, the processor executing the computer-readable instructions to:
acquire first information about a curved road located in a travel direction of a vehicle;
acquire second information about an acceleration operation of a driver of the vehicle; and
while the vehicle is traveling in a segment from an entrance to the curved road to a position a predetermined distance before the entrance or while the vehicle is traveling on the curved road,
perform assistance control that is one or both of deceleration control for decelerating the vehicle so that a speed of the vehicle approaches a target speed based on the first information and notification control for notifying that the speed of the vehicle approaches the target speed,
accelerate the vehicle at first acceleration in a case where the second information has been acquired when the vehicle is not traveling in the segment or on the curved road and the assistance control is not operating, and
accelerate the vehicle at second acceleration that is suppressed as compared with the first acceleration by ending the assistance control in a case where the second information has been acquired when the vehicle is performing the assistance control.

2. The vehicle control device according to claim 1, wherein the processor executes the computer-readable instructions to:
cause the acceleration of the vehicle to reach the target acceleration at a first time by accelerating the vehicle at the first acceleration in a case where the second information indicating that a first acceleration operation has been performed to cause the acceleration of the vehicle to approach the target acceleration has been acquired when the vehicle is not traveling in the segment or on the curved road and the assistance control is not operating; and
cause the acceleration of the vehicle to reach the target acceleration at a second time after the first time by ending the assistance control and accelerating the vehicle at the second acceleration in a case where the second information indicating that the first acceleration operation has been performed has been acquired when the assistance control is being performed.

3. The vehicle control device according to claim 1,
wherein the acceleration operation is performed by the driver operating an operation element, and
wherein the processor executes the computer-readable instructions to:
acquire information indicating an operation speed for the operation element included in the second information; and
increase the second acceleration as the operation speed increases.

4. The vehicle control device according to claim 1,
wherein the acceleration operation is performed by the driver operating an operation element, and
wherein the processor executes the computer-readable instructions to:

acquire information indicating an operation amount for the operation element included in the second information; and accelerate the vehicle until acceleration corresponding to the operation amount is reached.

5. The vehicle control device according to claim 1,
wherein the acceleration operation is performed by the driver operating an operation element, and
wherein the processor executes the computer-readable instructions to:
acquire operation information indicating one or both of an operation amount and an operation speed for the operation element included in the second information; and
accelerate the vehicle by stopping the assistance control when the operation information satisfies a condition.

6. The vehicle control device according to claim 5, wherein the condition is one of conditions (1) to (3),
wherein condition (1) is that the operation amount of a predetermined period reaches a first threshold value,
wherein condition (2) is that the operation element is operated at an operation speed greater than or equal to a second threshold value and the operation amount reaches a third threshold value, and
wherein condition (3) is that an operation of the operation amount greater than or equal to a fourth threshold value is performed a plurality of times.

7. The vehicle control device according to claim 1,
wherein the acceleration operation is performed by the driver operating an operation element, and
wherein the processor executes the computer-readable instructions to:
acquire information indicating an operation amount of an operation of accelerating the vehicle for the operation element included in the second information; and
stop the assistance control when a cumulative value of the operation amount at a predetermined time has reached a threshold value.

8. The vehicle control device according to claim 7, wherein the processor executes the computer-readable instructions to:
accumulate an operation amount of an operation on the operation element for accelerating the vehicle from the time when the operation element is operated to accelerate the vehicle to the time when a set time period elapses;
stop the assistance control when the accumulated operation amount has reached a threshold value; and
continue the assistance control even if the operation element is operated when the accumulated operation amount has not reached the threshold value before the set time period elapses.

9. The vehicle control device according to claim 1,
wherein the processor executes the computer-readable instructions to:
acquire information of a gradient of the curved road;
accelerate the vehicle at third acceleration by ending the assistance control in a case where the second information has been acquired when the gradient is a downward gradient and the assistance control is being performed; and
accelerate the vehicle at the second acceleration by ending the assistance control in a case where the second information has been acquired when the curved road does not have a downward gradient or the curved road is a flat road and the assistance control is being performed, and
wherein the third acceleration is acceleration that is suppressed as compared with the second acceleration.

10. The vehicle control device according to claim 9, wherein the processor executes the computer-readable instructions to suppress the third acceleration more when the downward gradient of the curved road is large than when the downward gradient of the curved road is small.

11. The vehicle control device according to claim 9,
wherein the acceleration operation is performed by the driver operating an operation element, and
wherein the processor executes the computer-readable instructions to:
acquire operation information indicating one or both of an operation amount and an operation speed for the operation element included in the second information;
accelerate the vehicle by stopping the assistance control when the operation information satisfies a condition; and
mitigate the condition as the gradient increases.

12. A vehicle control method comprising:
acquiring, by a computer, first information about a curved road located in a travel direction of a vehicle;
acquiring, by the computer, second information about an acceleration operation of a driver of the vehicle; and
while the vehicle is traveling in a segment from an entrance to the curved road to a position a predetermined distance before the entrance or while the vehicle is traveling on the curved road,
performing, by the computer, assistance control that is one or both of deceleration control for decelerating the vehicle so that a speed of the vehicle approaches a target speed based on the first information and notification control for notifying that the speed of the vehicle approaches the target speed,
accelerating, by the computer, the vehicle at first acceleration in a case where the second information has been acquired when the vehicle is not traveling in the segment or on the curved road and the assistance control is not operating, and
accelerating, by the computer, the vehicle at second acceleration that is suppressed as compared with the first acceleration by ending the assistance control in a case where the second information has been acquired when the vehicle is performing the assistance control.

13. A non-transitory computer storage medium storing a program for causing a computer to:
acquire first information about a curved road located in a travel direction of a vehicle;
acquire second information about an acceleration operation of a driver of the vehicle; and
while the vehicle is traveling in a segment from an entrance to the curved road to a position a predetermined distance before the entrance or while the vehicle is traveling on the curved road,
perform assistance control that is one or both of deceleration control for decelerating the vehicle so that a speed of the vehicle approaches a target speed based on the first information and notification control for notifying that the speed of the vehicle approaches the target speed,
accelerate the vehicle at first acceleration in a case where the second information has been acquired when the vehicle is not traveling in the segment or on the curved road and the assistance control is not operating, and
accelerate the vehicle at second acceleration that is suppressed as compared with the first acceleration by ending the assistance control in a case where the second information has been acquired when the vehicle is performing the assistance control.

\* \* \* \* \*